Patented Mar. 2, 1926.

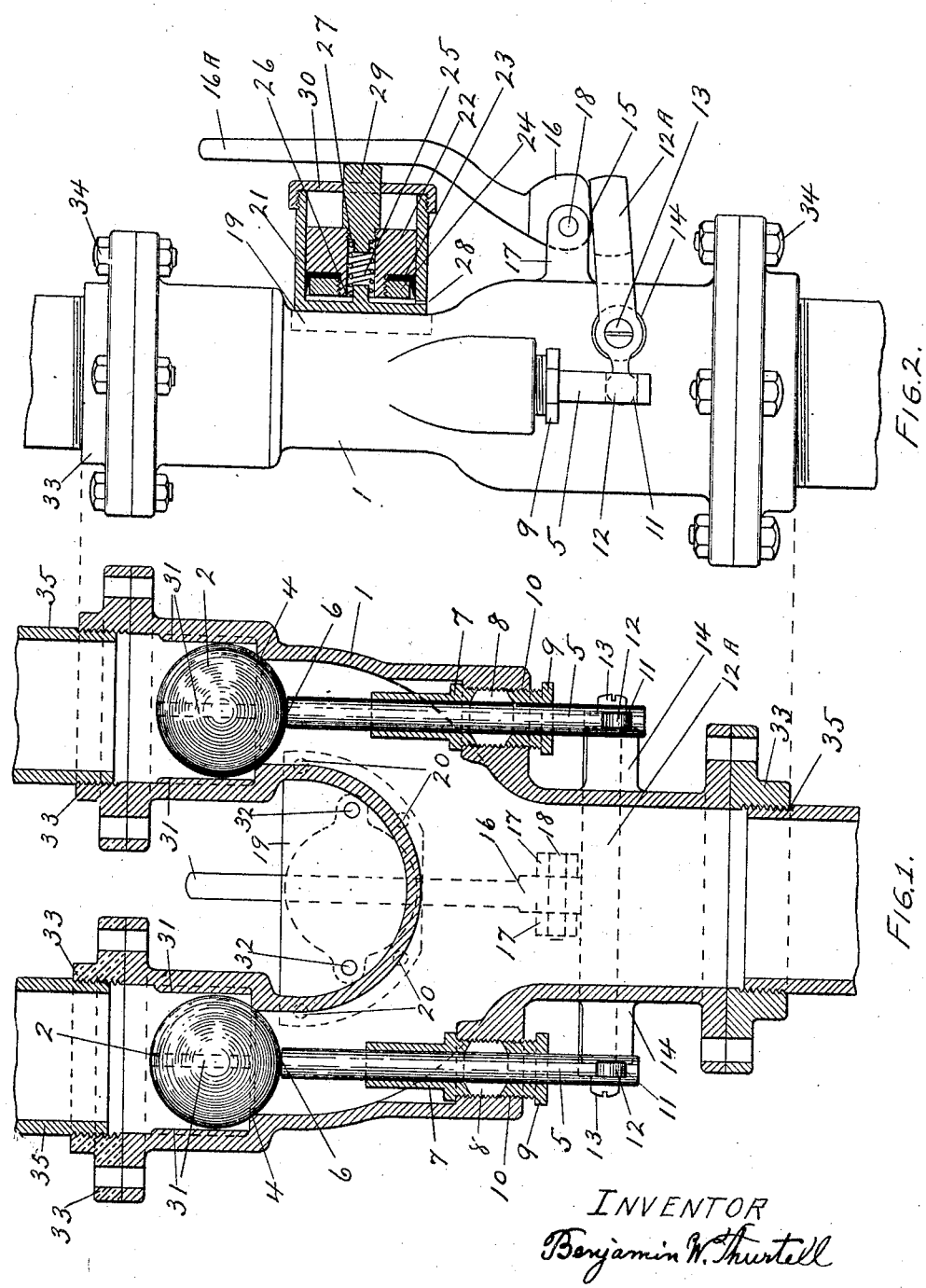

1,574,766

UNITED STATES PATENT OFFICE.

BENJAMIN W. THURTELL, OF CHICAGO, ILLINOIS.

VALVE FOR LIQUIDS.

Application filed June 16, 1924. Serial No. 720,333.

*To all whom it may concern:*

Be it known that I, BENJAMIN W. THURTELL, a citizen of the United States, residing at Chicago, county of Cook, and State of Illinois, have invented a new and useful form of Valve for Liquids, of which the following is a specification.

In all such valves, commonly called Fuller ball valves, the closing of the valve is accomplished by means of a ball or piece of some compressible or elastic substance, such as rubber, which, by being drawn by lever action against a metallic seat, closes the valve to the flow of water.

Where hot water is to pass the valve, the heat added to the constant wear on the yielding substance of the ball soon destroys the tightness of fit and the valve commences to leak.

To obviate this difficulty, I have so constructed my valve that a metallic ball may be used, which seats against a metallic seat by virtue of the liquid pressure against it, and when operated to permit the flow of liquid is pressed backward against the liquid pressure by means of a rod or plunger operated by some lever action.

In the accompanying drawings—

Fig. 1 shows in cross-section a valve designed for laundry use, having a Y-shaped form, one branch being designed for cold water and the other branch designed for hot water, the two branches uniting in one general conduit where the hot and cold water mix to give some mean temperature as desired, the ball normally seating by gravity. Fig. 2 is a side view of the valve having attached a pneumatic cushioning piston and cylinder, shown in section, for preventing a hammering action as the balls come to seat.

Fig. 1, 1 is a cross-section of the valve body. In the upper part of each branch is an enlargement in which rests a ball of brass or other metal 2, which seats at 4, and is held in alignment in its travel by the ribs 31, which allow water to pass by the balls when they are raised from the seat 4.

5 is a round bar of metal, against the upper end of which rests the ball 2, and which passes downward through a guide 7, screwed into the walls of the body 1 and through the stuffing box 8 and a gland 9, also screwed into the walls of the valve body at 10. In the lower end of rod 5 is a slot 11, into which fits the rounded end 12 of a yoke lever arm 12 A, shown in side view in Fig. 2 and in dotted lines in Fig. 1.

This yoke swivels on a screw shank shown at 13, which is screwed into a boss 14 cast on the body of the valve.

The horizontal portion of the yoke lever is flat on top as at 15, and against this rests an eccentric ended lever arm 16 which swivels on a pin 18 that passes through a slotted boss 17 shown on Fig. 1 and Fig. 2.

The upper part of the lever arm is designed as a handle, as at 16 A.

A plate 19 is fastened to the valve body 1 by means of screws 20, and fastened to the plate by screws 32 is a cylinder 21, containing a plunger 22, a cup leather 23 and nut 24 holding the cup leather in place. A compression spring 25 rests against the bottom of the cylinder 21 at 26, and against the end of a recess in plunger 22 at 27. An extension button 29 fastens into the plunger 22. 28 is a small orifice near the base of the cylinder to permit air to enter or leave slowly, the whole being so positioned that the handle 16 A will make contact with the button 29 as the valve closes. When the valve is open, the spring 25 will hold the plunger and button to the outer end of its travel, in contact with the cap 30.

33 are flange unions which fasten to the upper and lower outlets of the valve body by means of cap screws 34. 35 are broken sections of pipe that screw into the couplings 33.

In operation, when the handle 16 A is pulled downward, the eccentric 16, owing to the greater radius of action, will depress the lever 12 A, which swivels at 13, causing the opposite rounded ends 12 to rise, carrying with them the rods 5 into which they engage as at 11, and raising the balls 2 from their seats 4. This permits water to pass between the balls and the valve body and past the seats, thence flowing downward through the two branches and uniting in the lower common channel.

If, now, a hot water supply is connected to the left hand branch and a cold water supply is connected to the right hand branch, and suitable valves in the water supply lines are set to give some desired proportionate flow when the line is opened, then with given temperatures in the two supply lines another mean temperature will result when waters from the two branches unite in the common channel.

When a sufficient supply of water has been drawn, a slight upward pressure is exerted on the lever arm 16 A, until the larger radius 16 of the eccentric has passed a vertical line with the pin 18, when the water pressure on the balls 2, transmitted downward against rods 5 and lever arm 12, causing opposite end 12 A to press upwardly against the eccentric 16, will cause the handle 16 A to fly upward rapidly and strike the button 29, driving it and the plunger toward the bottom of the cylinder, compressing the air underneath the plunger and checking the rapid seating of the balls and preventing any damage that might result due to too rapid a contact between the ball and its seat, the compressed air escaping slowly through the small orifice 28 near the base of the cylinder. As it may readily be seen, any scarring of the ground surfaces of the ball or seat will cause leakage. Another advantage of this arrangement is that as the rush of water past the ball occurs when the valve is open, it will cause a certain amount of rotation of the ball, so that it will always seat at a slightly different position, thus causing an aproximately even wear over the surface of the ball that will aid in maintaining the true spherical shape.

Therefore I claim:

1. In a valve structure, the combination of a valve body having a plurality of intake passageways and an outlet passageway, valve seats formed in said intake passageways and a ball valve for each seat, a vertically slidable stem below each ball valve, an actuating lever for each stem pivoted to the valve body and connected at its inner end with the lower end of the stem, the outer ends of said levers being connected by a bar, and an actuating member engaging with said bar to cause simultaneous movement of said levers and raising of the stems to unseat the ball valves.

2. In a valve structure, the combination of a valve body having a plurality of passageways each provided with a valve seat, a ball valve in each passageway co-operating with the seat therein, a vertically slidable stem below each ball valve and extending to the exterior of the valve body, a bar, levers extending from said bar and pivoted to the valve body, the inner end of each lever engaging with the lower end of one of said stems, and a cam member pivoted to said valve body for engagement with said bar to cause said levers to be swung to simultaneously raise said stems and lift the ball valves off their seat.

3. In a valve structure, the combination of a body having a plurality of passageways each provided with a seat and a ball valve therefor, stems vertically reciprocable below said ball valves, a frame pivoted intermediate its ends to said body and pivoted at its inner ends to the lower ends of said stems, and a cam member pivoted to said body above the outer end of said frame, an actuating lever for said cam member, actuation of said cam causing movement of said frame to simultaneously raise the stem and the valve balls, said cam member having a locking surface for locking the frame in such valve ball raising position.

4. In a valve structure comprising a valve body having a passageway provided with a valve seat, a heavy ball valve for said seat, a stem slidable vertically below the center of said valve and extending to the interior of the valve body, a lever pivoted intermediate its ends to the valve body and having pivotal connection at its inner end with the lower end of said stem, an actuating lever pivoted to the valve body above the outer end of said lever and having a flattened surface normally engaged by said lever when the valve ball is on its seat, said lever having a cam surface for engaging the said valve lever to cause raising of said stem and removal of the ball valve member from its seat, and means for preventing sudden return of said actuating lever to normal position and for causing retarded seating movement of said valve.

5. In a valve structure, the combination of a valve body having parallel inlet passageways, and a common outlet passageway, each inlet passageway having a valve seat and a ball valve therefor, a vertical stem axially below each ball valve and slidable in said body, a bar, arms extending from the ends of said bar and pivoted to the valve body, the inner end of each bar being connected with the lower end of the corresponding stem, and actuating lever pivoted to said valve body over said bar, said actuating lever having a flat surface and the weight of said ball valve on said stem normally holding said bar against said flat surface, said lever having a cam surface for engagement with said bar to swing said arm to cause vertical movement of said stem and raising of said ball valves from their seats, said actuating lever tending to be thrown back suddenly when moved toward normal position, and cushioning means for retarding such return movement, whereby said ball valves will be reseated slowly and injury to their valve seats prevented.

BENJAMIN W. THURTELL.